US010093830B2

(12) United States Patent
Lim et al.

(10) Patent No.: US 10,093,830 B2
(45) Date of Patent: Oct. 9, 2018

(54) COMPOSITION FOR FORMING A SILICA BASED LAYER, METHOD FOR MANUFACTURING SILICA BASED LAYER, AND ELECTRONIC DEVICE INCLUDING THE SILICA BASED LAYER

(71) Applicant: SAMSUNG SDI CO., LTD., Yongin-si, Gyeonggi-do (KR)

(72) Inventors: Wan-Hee Lim, Suwon-si (KR); Taek-Soo Kwak, Suwon-si (KR); Han-Song Lee, Suwon-si (KR); Eun-Su Park, Suwon-si (KR); Sun-Hae Kang, Suwon-si (KR); Bo-Sun Kim, Suwon-si (KR); Sang-Kyun Kim, Suwon-si (KR); Sae-Mi Park, Suwon-si (KR); Jin-Hee Bae, Suwon-si (KR); Jin-Woo Seo, Suwon-si (KR); Jun-Young Jang, Suwon-si (KR); Youn-Jin Cho, Suwon-si (KR); Kwen-Woo Han, Suwon-si (KR); Byeong-Gyu Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/842,632

(22) Filed: Sep. 1, 2015

(65) Prior Publication Data
US 2016/0177133 A1 Jun. 23, 2016

(30) Foreign Application Priority Data
Dec. 19, 2014 (KR) ........................ 10-2014-0184766

(51) Int. Cl.
*C09D 103/14* (2006.01)
*C09D 183/14* (2006.01)
*C08K 5/01* (2006.01)
*C09D 183/16* (2006.01)
*C08G 77/54* (2006.01)
*C08G 77/62* (2006.01)

(52) U.S. Cl.
CPC ............. *C09D 183/14* (2013.01); *C08K 5/01* (2013.01); *C09D 183/16* (2013.01); *C08G 77/54* (2013.01); *C08G 77/62* (2013.01)

(58) Field of Classification Search
CPC ................................. C08G 77/62; B32B 9/045
See application file for complete search history.

(56) References Cited
U.S. PATENT DOCUMENTS

| | | |
|---|---|---|
| 3,170,962 A | 2/1965 | Tyler |
| 3,453,304 A | 7/1969 | Selin |
| 3,758,624 A | 9/1973 | Perilstein |
| 4,975,512 A | 12/1990 | Funayama et al. |
| 4,992,108 A | 2/1991 | Ward et al. |
| 5,151,390 A | 9/1992 | Aoki et al. |
| 5,354,506 A | 10/1994 | Niebylski |
| 5,459,114 A | 10/1995 | Kaya et al. |
| 5,688,864 A | 11/1997 | Goodwin |
| 5,747,623 A | 5/1998 | Matsuo et al. |
| 6,200,947 B1 | 3/2001 | Takashima et al. |
| 6,359,096 B1 | 3/2002 | Zhong et al. |
| 6,413,202 B1 | 7/2002 | Leonte et al. |
| 6,451,955 B1 | 9/2002 | Hausladen et al. |
| 6,767,641 B1 * | 7/2004 | Shimizu ............... C23C 18/1212 257/E21.261 |
| 8,058,711 B2 | 11/2011 | Lim et al. |
| 8,252,101 B1 | 8/2012 | Glemba et al. |
| 8,372,479 B2 | 2/2013 | Di Loreto |
| 2002/0015851 A1 | 2/2002 | Higuchi et al. |
| 2002/0160614 A1 | 10/2002 | Cho et al. |
| 2003/0092565 A1 | 5/2003 | Chaudhari et al. |
| 2003/0105264 A1 | 6/2003 | Bedwell et al. |
| 2004/0013858 A1 | 1/2004 | Hacker et al. |
| 2004/0224537 A1 | 11/2004 | Lee et al. |
| 2005/0026443 A1 | 2/2005 | Goo et al. |
| 2005/0181566 A1 | 8/2005 | Machida et al. |
| 2005/0238392 A1 | 10/2005 | Okamoto et al. |
| 2007/0049616 A1 | 3/2007 | Ksander et al. |
| 2007/0161530 A1 | 7/2007 | Kaneda et al. |
| 2008/0102211 A1 | 5/2008 | Matsuo et al. |
| 2008/0234163 A1 | 9/2008 | Shimizu et al. |
| 2010/0139697 A1 | 6/2010 | Martens et al. |
| 2010/0167535 A1 | 7/2010 | Nishiwaki et al. |
| 2012/0034767 A1 | 2/2012 | Xiao et al. |
| 2012/0064722 A1 | 3/2012 | Sakurai |

(Continued)

FOREIGN PATENT DOCUMENTS

| | | |
|---|---|---|
| CN | 1260811 A | 7/2000 |
| CN | 101679923 A | 3/2010 |

(Continued)

OTHER PUBLICATIONS

TW Search Report dated May 24, 2016, for corresponding TW Patent Application No. 104129710 (1 page).
U.S. Office Action dated Jun. 21, 2017, issued in cross-reference U.S. Appl. No. 14/754,346 (8 pages).
U.S. Office Action dated Mar. 7, 2017, issued in cross-reference U.S. Appl. No. 14/839,642 (10 pages).
U.S. Office Action dated Jun. 20, 2017, issued in cross-reference U.S. Appl. No. 14/839,642 (10 pages).
U.S. Advisory Action dated May 8, 2017, issued in cross-reference U.S. Appl. No. 14/754,346 (6 pages).
U.S. Office Action dated May 8, 2017, issued in cross-reference U.S. Appl. No. 15/061,670 (10 pages).

(Continued)

Primary Examiner — Kuo Liang Peng
(74) Attorney, Agent, or Firm — Lewis Roca Rothgerber Christie LLP

(57) ABSTRACT

A composition for forming a silica based layer includes a silicon-containing compound including polysilazane, polysiloxazane, or a combination thereof and one or more kinds of solvent, and having a turbidity increasing rate of less than or equal to about 0.13.

13 Claims, No Drawings

(56) References Cited

U.S. PATENT DOCUMENTS

| | | | |
|---|---|---|---|
| 2012/0164382 | A1 | 6/2012 | Yun et al. |
| 2012/0177829 | A1 | 7/2012 | Lim et al. |
| 2012/0263867 | A1 | 10/2012 | Kanbe et al. |
| 2013/0017662 | A1 | 1/2013 | Park et al. |
| 2013/0252869 | A1 | 9/2013 | Oh et al. |
| 2013/0323904 | A1 | 12/2013 | Takano et al. |
| 2014/0057003 | A1 | 2/2014 | Johnson |
| 2014/0099510 | A1 | 4/2014 | Chiong et al. |
| 2014/0099554 | A1 | 4/2014 | Inoue et al. |
| 2014/0106576 | A1 | 4/2014 | Morita et al. |
| 2014/0120352 | A1 | 5/2014 | Miyahara et al. |
| 2014/0315367 | A1 | 10/2014 | Bae et al. |
| 2015/0093545 | A1 | 4/2015 | Han et al. |
| 2015/0234278 | A1 | 8/2015 | Hatakeyama et al. |
| 2016/0315286 | A1 | 10/2016 | Kuroki et al. |

FOREIGN PATENT DOCUMENTS

| | | |
|---|---|---|
| CN | 101111575 B | 6/2010 |
| CN | 102153951 A | 8/2011 |
| CN | 102569060 A | 7/2012 |
| CN | 102874813 A | 1/2013 |
| CN | 103380487 A | 10/2013 |
| CN | 103582559 A | 2/2014 |
| CN | 103910885 A | 7/2014 |
| JP | 5-148720 A | 6/1993 |
| JP | 05-243223 A | 9/1993 |
| JP | 10-046108 A | 2/1998 |
| JP | 10-194826 A | 7/1998 |
| JP | 10-321719 A | 12/1998 |
| JP | 2001-308090 A | 11/2001 |
| JP | 2003-197611 A | 7/2003 |
| JP | 2004-96076 A | 3/2004 |
| JP | 2004-331733 A | 11/2004 |
| JP | 3760028 B2 | 3/2006 |
| JP | 2006-253310 A | 9/2006 |
| JP | 3912697 B2 | 2/2007 |
| JP | 4101322 B2 | 3/2008 |
| JP | 2008-088224 A | 4/2008 |
| JP | 2008-305974 A | 12/2008 |
| JP | 4349390 B2 | 10/2009 |
| JP | 2010-59280 A | 3/2010 |
| JP | 2010-61722 A | 3/2010 |
| JP | 2010-177647 A | 8/2010 |
| JP | 2011-142207 A | 7/2011 |
| JP | 2012-983 A | 1/2012 |
| JP | 2012-94739 A | 5/2012 |
| JP | 5250813 B2 | 7/2013 |
| JP | 2015-58687 A | 3/2015 |
| JP | 2015-512561 A | 4/2015 |
| JP | 5691175 B2 | 4/2015 |
| KR | 2001-0006446 A | 1/2001 |
| KR | 10-2002-0025680 A | 4/2002 |
| KR | 10-0364026 B1 | 12/2002 |
| KR | 10-0397174 B1 | 9/2003 |
| KR | 10-0464859 B1 | 1/2005 |
| KR | 10-2005-0056872 A | 6/2005 |
| KR | 10-0503527 B1 | 7/2005 |
| KR | 10-2005-0084617 A | 8/2005 |
| KR | 10-2005-0104610 A | 11/2005 |
| KR | 10-0611115 B1 | 8/2006 |
| KR | 10-2006-0134098 A | 12/2006 |
| KR | 10-2007-0028518 A | 3/2007 |
| KR | 10-2007-0108214 A | 11/2007 |
| KR | 10-0859276 B1 | 9/2008 |
| KR | 10-2010-0138997 | 12/2010 |
| KR | 10-2011-0006586 A | 1/2011 |
| KR | 10-2011-0012574 A | 2/2011 |
| KR | 10-2011-0023411 A | 3/2011 |
| KR | 10-2011-0062158 A | 6/2011 |
| KR | 10-2011-0073176 A | 6/2011 |
| KR | 10-2011-0081043 | 7/2011 |
| KR | 10-1118625 | 3/2012 |
| KR | 10-1142369 B1 | 5/2012 |
| KR | 10-2012-0071311 A | 7/2012 |
| KR | 10-2013-0064026 | 6/2013 |
| KR | 10-2013-0064066 A | 6/2013 |
| KR | 10-1332306 B1 | 11/2013 |
| KR | 10-2013-0137596 | 12/2013 |
| KR | 10-2014-0011506 A | 1/2014 |
| KR | 10-2014-0063518 | 5/2014 |
| KR | 10-2014-0085119 A | 7/2014 |
| KR | 10-2014-0085264 A | 7/2014 |
| KR | 10-2014-0087644 A | 7/2014 |
| KR | 10-2014-0087998 | 7/2014 |
| KR | 10-2014-0087998 A | 7/2014 |
| KR | 10-2014-0125203 A | 10/2014 |
| KR | 10-2014-0127313 A | 11/2014 |
| KR | 10-2014-0139946 | 12/2014 |
| KR | 10-2015-0019949 A | 2/2015 |
| KR | 10-2015-0039084 | 4/2015 |
| KR | 10-2015-0039084 A | 4/2015 |
| TW | 200946453 A1 | 11/2009 |
| TW | 201132716 A1 | 10/2011 |
| TW | 201233741 A1 | 8/2012 |
| TW | 201439685 A | 10/2014 |
| TW | 201441365 A | 11/2014 |
| TW | 201522508 A | 6/2015 |

OTHER PUBLICATIONS

Machine English Translation of JP 3912697 B2, Feb. 9, 2007, 11 Pages.
Machine English Translation of JP 4101322 B2, Mar. 28, 2008, 9 Pages.
Korean Patent Abstracts for Korean Publication No. 1020040068989 A, Corresponding to Korean Patent No. 10-0859276 B1, Sep. 19, 2008, 1 Page.
TIPO Search Report dated Nov. 9, 2015, for corresponding Taiwanese Patent Application No. 104117087, (1 page).
TIPO Search Report dated Aug. 2, 2016, for corresponding Taiwanese Patent Application No. 104125161 (1 page).
Partial English Translation of relevant parts of TW 201441365 A dated Nov. 1, 2014, listed above.
U.S. Office Action dated Mar. 24, 2016, for cross-reference U.S. Appl. No. 14/720,674 (13 pages).
U.S. Office Action dated Jun. 17, 2016, for cross-reference U.S. Appl. No. 14/488,440 (7 pages).
U.S. Office Action dated Aug. 18, 2016, for cross-reference U.S. Appl. No. 14/754,346 (11 pages).
U.S. Office Action dated Sep. 8, 2016, for cross-reference U.S. Appl. No. 14/720,674 (24 pages).
U.S. Office Action dated Nov. 14, 2016, for cross-reference U.S. Appl. No. 14/488,440 (10 pages).
U.S. Office Action dated Dec. 15, 2016, for cross-reference U.S. Appl. No. 15/061,670 (10 pages).
U.S. Office Action dated Mar. 2, 2017, for cross reference U.S. Appl. No. 14/754,346 (9 pages).
U.S. Notice of Allowance dated Mar. 7, 2018, issued in U.S. Appl. No. 14/720,674 (9 pages).
U.S. Office Action dated Aug. 1, 2017, issued in cross-reference U.S. Appl. No. 14/720,674 (12 pages).
U.S. Office Action dated Sep. 14, 2017, issued in cross-reference U.S. Appl. No. 15/061,670 (8 pages).
U.S. Advisory Action dated Oct. 3, 2017, issued in cross-reference U.S. Appl. No. 14/839,642 (4 pages).
U.S. Notice of Allowance dated Nov. 20, 2017, issued in U.S. Appl. No. 14/720,674 (8 pages).
U.S. Office Action dated Nov. 22, 2017, issued in U.S. Appl. No. 14/839,642 (10 pages).
SIPO Office Action dated Aug. 2, 2017, for corresponding Chinese Patent Application No. 201510591897.4 (8 pages).
U.S. Final Office Action dated Jan. 26, 2018, issued in U.S. Appl. No. 15/061,670 (6 pages).
U.S. Office Action dated Feb. 7, 2018, issued in U.S. Appl. No. 14/754,346 (9 pages).
Heemken et al., "Comparison of ASE and SFE with Soxhlet, Sonication, and Methanolic Saponification Extractions for the Determination of Organic Micropollutants in Marine Particulate Matter," Analytical Chemistry, vol. 69, No. 11, Jun. 1, 1997, pp. 2171-2180.

(56) References Cited

OTHER PUBLICATIONS

TIPO Search Report dated Sep. 7, 2016, corresponding to Taiwanese Patent Application No. 105108604 (1 page).
U.S. Office Action dated Nov. 3, 2017, for U.S. Appl. No. 14/754,346 (8 pages).
U.S. Final Office Action dated May 15, 2018, issued in U.S. Appl. No. 14/839,642 (11 pages).
KIPO Office Action dated May 1, 2017, for corresponding Korean Patent Application No. 10-2014-0184766 (5 pages).
KIPO Office action dated Mar. 22, 2017, corresponding to Korean Patent Application No. 10-2014-0188905 (6 pages).

* cited by examiner

COMPOSITION FOR FORMING A SILICA BASED LAYER, METHOD FOR MANUFACTURING SILICA BASED LAYER, AND ELECTRONIC DEVICE INCLUDING THE SILICA BASED LAYER

CROSS-REFERENCE TO RELATED APPLICATION

This application claims priority to and the benefit of Korean Patent Application No. 10-2014-0184766, filed in the Korean Intellectual Property Office on Dec. 19, 2014, the entire content of which is incorporated herein by reference.

BACKGROUND

1. Field

This disclosure relates to a composition for forming a silica based layer, a method of manufacturing a silica based layer, and an electronic device including the silica based layer.

2. Description of the Related Art

A flat panel display uses a thin film transistor (TFT)—including a gate electrode, a source electrode, a drain electrode and a semiconductor—as a switching device and is equipped with a gate line transferring a scan signal for controlling the thin film transistor and a data line transferring a signal applied to a pixel electrode. In addition, an insulation layer is formed between the semiconductor and the several electrodes to separate them. The insulation layer may be formed by using a silica-based composition. Herein, the insulation layer may have a defect due to a plurality of reason during the manufacturing process, and the defect may have a negative influence on a yield and reliability of a device including the flat panel display.

SUMMARY

An aspect of an embodiment is directed toward a composition for forming a silica based layer capable of reducing or minimizing generation of a defect in a layer.

Another aspect of an embodiment is directed toward a method of manufacturing a silica based layer using the composition for forming a silica based layer.

Yet another aspect of an embodiment is directed toward an electronic device including silica based layer manufactured according to the method.

According to one embodiment, provided is a composition for forming a silica based layer including a silicon-containing compound including polysilazane, polysiloxazane, or a combination thereof and one or more kinds of solvent, and having a turbidity increasing rate of less than or equal to about 0.13. Here, the turbidity-increasing rate is defined by Relationship Equation 1, and the gelation time is measured at a temperature of about 23° C.±about 2° C. under a relative humidity of about 50%±about 10%.

Turbidity increasing rate (NTU/hr)=(Turbidity at gelation−Initial turbidity)/Gelation time Relationship Equation 1

The silicon-containing compound may include polysilazane including a moiety represented by Chemical Formula 1.

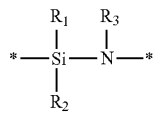

Chemical Formula 1

In Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof.

"*" indicates a linking point.

The silicon-containing compound may include polysiloxazane including a moiety represented by Chemical Formula 2.

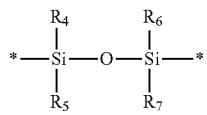

Chemical Formula 2 wherein, $R_4$ to $R_7$ of Chemical Formula 2 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof.

"*" indicates a linking point.

The solvent may include at least one selected from trimethylbenzene, triethylbenzene, decahydronaphthalene, tetrahydronaphthalene, indene, diethylbenzene, and methylnaphthalene.

The composition may have a turbidity increasing rate of less than or equal to about 0.125.

According to another embodiment, provided is a method for manufacturing a silica based layer that includes coating the composition for forming the silica based layer on the substrate, drying the substrate coated with the composition to produce a resultant, and curing the resultant under an inert atmosphere at a temperature of greater than or equal to about 150° C. to manufacture a silica based layer.

The composition for forming the silica based layer may be coated utilizing a spin-on coating method.

According to yet another embodiment, an electronic device including a silica based layer manufactured utilizing the composition is provided.

In certain embodiments, a composition for forming a silica based layer having excellent storage-stability may be provided.

DETAILED DESCRIPTION

Exemplary embodiments of the present invention will hereinafter be described in more detail, and may be easily performed by those who have common knowledge in the related art. However, this disclosure may be embodied in many different forms and is not construed as limited to the exemplary embodiments set forth herein.

It will be understood that when an element such as a layer, film, region, or substrate is referred to as being "on" another element, it can be directly on the other element or intervening element(s) may also be present. In contrast, when an element is referred to as being "directly on" another element, there are no intervening elements present.

As used herein, when a definition is not otherwise provided, the term 'substituted' refers to one substituted with (other than by hydrogen) a substituent (on a compound) selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, phosphoric acid or a salt thereof, alkyl group, a C2 to C16 alkenyl group, a C2 to C16 alkynyl group, aryl group, a C7 to C13 arylalkyl group, a C1 to C4 oxyalkyl group, a C1 to C20 heteroalkyl group, a C3 to C20 heteroarylalkyl group, a cycloalkyl group, a C3 to C15 cycloalkenyl group, a C6 to C15 cycloalkynyl group, a heterocycloalkyl group, and a combination thereof.

As used herein, when a definition is not otherwise provided, the term 'hetero' refers to one including 1 to 3 heteroatoms selected from N, O, S, and P.

In addition, in the specification, the mark "*" refers to where something is connected with the same or different atom or chemical formula.

Hereinafter, a composition for forming a silica based layer according to one embodiment of the present invention is described.

A composition for forming a silica based layer according to one embodiment of the present invention includes a silicon-containing compound including polysilazane, polysiloxazane, or a combination thereof, and a solvent.

According to one embodiment, provided is a composition for forming a silica based layer including a silicon-containing compound including polysilazane, polysiloxazane, or a combination thereof and one or more kinds of solvent, and having a turbidity increasing rate of less than or equal to about 0.13.

The turbidity increasing rate of the composition may be calculated according to Relationship Equation 1.

Turbidity increasing rate (NTU/hr)=(Turbidity at gelation−Initial turbidity)/Gelation time    Relationship Equation 1

The gelation time is measured at a temperature of about 23° C.±about 2° C. under a relative humidity of about 50%±about 10%.

When the composition has the turbidity increasing rate within the range, the composition may have excellent storage-stability and excellent defect level when formed into a layer and thus, improve a manufacturing yield and performance of a device. Specifically, the composition may have a turbidity increasing rate of less than or equal to about 0.125.

The polysilazane of the composition for forming a silica based layer may include a moiety represented by Chemical Formula 1.

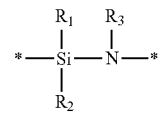

Chemical Formula 1

In Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group or a combination thereof.

The polysilazane may be prepared by the various suitable methods, for example, it can be prepared by reacting halosilane with ammonia.

The polysiloxazane of the composition for forming a silica based layer may include a moiety represented by Chemical Formula 2.

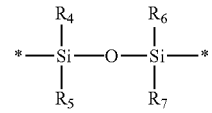

Chemical Formula 2

In Chemical Formula 2, $R_4$ to $R_7$ each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group or a combination thereof.

In this way, when the composition further includes a moiety represented by Chemical Formula 2, polysiloxazane prepared according to the embodiment includes a silicon-oxygen-silicon (Si—O—Si) bond moiety other than a silicon-nitrogen (Si—N) bond moiety in its structure, and the silicon-oxygen-silicon (Si—O—Si) bond moiety may weaken stress during curing by a heat treatment and reduce contraction.

Furthermore, the polysilazane or polysiloxazane of the composition for forming a silica based layer may include a moiety represented by Chemical Formula 3 at the terminal end.

Chemical Formula 3

The moiety represented by Chemical Formula 3 is a structure where the terminal end is capped with hydrogen, and may be included in an amount of about 15 to about 35 wt % based on the total amount of the Si—H bond of the polysilazane or polysiloxazane structure. When the moiety of Chemical Formula 3 is included in the polysilazane or polysiloxazane structure within the range, a $SiH_3$ moiety is prevented from being scattered into $SiH_4$ while an oxidation reaction sufficiently occurs during the heat treatment, and a crack in a filler pattern may be prevented.

The silica-based compound may be included in an amount of about 0.1 to about 50 wt % based on the total amount of the composition for forming a silica based layer. When it is included within the range, it may maintain an appropriate viscosity and bring about flat and uniform layer with no gap (void).

The solvent of the composition for forming a silica based layer may include at least one selected from trimethylbenzene, triethylbenzene, decahydronaphthalene, tetrahydronaphthalene, indene, diethylbenzene, and methylnaphthalene.

The composition for forming a silica based layer may further include a thermal acid generator (TAG).

The thermal acid generator may be an additive to improve a developing property of the composition for forming a silica based layer (e.g., to improve a developing property of the polysilazane or polysiloxazane), and thus makes silicon-containing compounds of the composition be developed at a relatively low temperature.

The thermal acid generator may include any compound without particular limit, if it generates acid ($H^+$) by heat. In particular, it may include a compound activated at a temperature of 90° C. or higher and generating sufficient acid and also, having low volatility.

The thermal acid generator may be, for example selected from nitrobenzyl tosylate, nitrobenzyl benzenesulfonate, phenol sulfonate, and a combination thereof.

The thermal acid generator may be included in an amount of about 0.01 to about 25 wt % based on the total amount of the composition for forming a silica based layer. Within the range, the compound may be developed at a low temperature and simultaneously, have improved coating properties.

The composition for forming a silica based layer may further include a surfactant.

The surfactant is not particularly limited, and may be, for example a non-ionic surfactant such as polyoxyethylene alkyl ethers (such as polyoxyethylene lauryl ether, polyoxyethylene stearyl ether, polyoxyethylene cetyl ether, polyoxyethylene oleyl ether, and/or the like), polyoxyethylene alkylallyl ethers (such as polyoxyethylenenonyl phenol ether, and/or the like), polyoxyethylene.polyoxypropylene block copolymers, polyoxyethylene sorbitan fatty acid ester (such as sorbitan monolaurate, sorbitan monopalmitate, sorbitan monostearate, sorbitan monoleate, polyoxyethylene sorbitan monostearate, polyoxyethylene sorbitan trioleate, polyoxyethylene sorbitan tristearate, and/or the like); a fluorine-based surfactant of EFTOP EF301, EF303, EF352 (Tochem Products Co., Ltd.), MEGAFACE F171, F173 (Dainippon Ink & Chem., Inc.), FLUORAD FC430, FC431 (Sumitomo 3M), Asahi guardAG710, Surflon S-382, SC101, SC102, SC103, SC104, SC105, SC106 (Asahi Glass Co., Ltd.), and/or the like; and/or other silicone-based surfactant (such as a organosiloxane polymer KP341 (Shin-Etsu Chemical Co., Ltd.), and/or the like).

The surfactant may be included in an amount of about 0.001 to about 10 wt % based on the total amount of the composition for forming a silica based layer. Within the range, dispersion of a solution and simultaneously, uniform thickness of a layer may be improved.

The composition for forming a silica based layer may be a solution obtained by dissolving the silicon-containing compound and the components in a solvent.

According to another embodiment of the present invention, a method for manufacturing a silica based layer includes coating the composition for forming a silica based layer on the substrate; drying the substrate coated with the composition for forming a silica based layer to produce a resultant; and curing the resultant under an inert gas atmosphere at (with) a temperature of greater than or equal to about 150° C.

For example, the composition for forming a silica based layer may be coated utilizing a solution process such as a spin-on coating method.

The substrate may be, for example a device substrate such as a semiconductor, a liquid crystal and/or the like, but is not limited thereto.

According to another embodiment of the present invention, an electronic device including the silica based layer manufactured according to the method is provided. The electronic device may be, for example a display device such as LCD or LED, or a semiconductor device, and the silica based layer may be an insulation layer or a filling layer of the electronic device.

The following examples illustrate embodiments of the present invention in more detail. However, these embodiments are exemplary, and the present disclosure is not limited thereto.

PREPARATION OF COMPOSITION FOR FORMING SILICA BASED LAYER

Comparative Example 1

Dry nitrogen was substituted inside a 2 L reactor equipped with an agitator and a temperature controller. Then, 1,500 g of dry pyridine was put in the reactor, and the reactor was maintained at a temperature of 0° C. Subsequently, 100 g of dichlorosilane was slowly injected thereinto over one hour. Then, 70 g of ammonia was slowly injected thereinto over 3 hours, while the mixture was agitated. Subsequently, dry nitrogen was injected thereinto for 30 minutes, and the ammonia remaining in the reactor was removed. The obtained white slurry product was filtered through a 1 um polytetrafluoroethylene (Teflon) filter under a dry nitrogen atmosphere, thereby obtaining 1,000 g of a filtered solution. Then, 1,000 g of dry xylene was added thereto, and the mixture was adjusted to have a solid concentration of 30 wt % by repetitively substituting pyridine for the xylene for three times by using a rotary evaporator (rotavap/rotovap)) and then, filtered with a polytetrafluoroethylene (Teflon) filter having a pore size of 0.03 µm.

Subsequently, 300 g of dry pyridine was added to the filtered solution, and the mixture was heated at a temperature of 100° C. until its weight average molecular weight reached 8,000. Then, 1,000 g of dry dibutylether was added thereto, and the mixture was adjusted to have a solid of 20 wt % by repetitively substituting dibutylether for the solvent for three times by using a rotary evaporator, thereby obtaining a polysilazane solution. Polysilazane in the solution had a weight average molecular weight of 8,000. In the present specification, the weight average molecular weight and the polydispersity of the polysilazane were respectively measured by using GPC (PLC Pump 1515, RI Detector 2414) made by Waters Corp.

The polysilazane solution obtained through the process was used to prepare a composition for forming a silica based layer.

Comparative Example 2

A heat treatment was performed through the same process as Comparative Example 1 until polysilazane had a weight average molecular weight of 23,000. Then, a polysilazane solution obtained through the same solvent substitution as Comparative Example 1 by using dibutylether was filtered, thereby preparing a composition for forming a silica based layer.

Comparative Example 3

A heat treatment was performed through the same process as Comparative Example 1 until polysilazane had a weight average molecular weight of 8,000. Then, a polysilazane solution obtained through the same solvent substitution as Comparative Example 1 by using propylene glycol monomethyl ether acetate was filtered, thereby preparing a composition for forming a silica based layer.

Comparative Example 4

A heat treatment was performed through the same process as Comparative Example 1 until polysilazane had a weight average molecular weight of 23,000. Then, a polysilazane solution obtained through the same solvent substitution as Comparative Example 1 by using propylene glycol monomethyl ether acetate was filtered, thereby preparing a composition for forming a silica based layer.

Example 1

A heat treatment was performed through the same process as Comparative Example 1 until polysilazane had a weight average molecular weight of 8,000. Then, a polysilazane solution obtained through the same solvent substitution as Comparative Example 1 by using decahydronaphthalene was filtered, thereby preparing a composition for forming a silica based layer.

Example 2

A heat treatment was performed through the same process as Comparative Example 1 until polysilazane had a weight average molecular weight of 23,000. Then, a polysilazane solution obtained through the same solvent substitution as Comparative Example 1 by using decahydronaphthalene was filtered, thereby preparing a composition for forming a silica based layer.

Example 3

A heat treatment was performed through the same process as Comparative Example 1 until polysilazane had a weight average molecular weight of 8,000. Then, a polysilazane solution obtained through the same solvent substitution as Comparative Example 1 by using tetrahydronaphthalene was filtered, preparing a composition for forming a silica based layer.

Example 4

A heat treatment was performed through the same process as Comparative Example 1 until polysilazane had a weight average molecular weight of 23,000. Then, a polysilazane solution obtained through the same solvent substitution as Comparative Example 1 by using tetrahydronaphthalene was filtered, thereby preparing a composition for forming a silica based layer.

Example 5

A heat treatment was performed through the same process as Comparative Example 1 until polysilazane had a weight average molecular weight of 8,000. Then, a polysilazane solution obtained through the same solvent substitution as Comparative Example 1 by using diethylbenzene was filtered, thereby preparing a composition for forming a silica based layer.

Example 6

A heat treatment was performed through the same process as Comparative Example 1 until polysilazane had a weight average molecular weight of 23,000. Then, a polysilazane solution obtained through the same solvent substitution as Comparative Example 1 by using diethylbenzene was filtered, thereby preparing a composition for forming a silica based layer.

Example 7

A heat treatment was performed through the same process as Comparative Example 1 until polysilazane had a weight average molecular weight of 8,000. Then, a polysilazane solution obtained through the same solvent substitution as Comparative Example 1 by using indene was filtered, thereby preparing a composition for forming a silica based layer.

Example 8

A heat treatment was performed through the same process as Comparative Example 1 until polysilazane had a weight average molecular weight of 23,000. Then, a polysilazane solution obtained through the same solvent substitution as Comparative Example 1 by using indene was filtered, thereby preparing a composition for forming a silica based layer.

Example 9

A heat treatment was performed through the same process as Comparative Example 1 until polysilazane had a weight average molecular weight of 8,000. Then, a polysilazane solution obtained through the same solvent substitution as Comparative Example 1 by using trimethylbenzene was filtered, thereby preparing a composition for forming a silica based layer.

Example 10

A heat treatment was performed through the same process as Comparative Example 1 until polysilazane had a weight average molecular weight of 23,000. Then, a polysilazane solution obtained through the same solvent substitution as Comparative Example 1 by using trimethylbenzene was filtered, thereby preparing a composition for forming a silica based layer.

Example 11

A heat treatment was performed through the same process as Comparative Example 1 until polysilazane had a weight average molecular weight of 8,000. Then, a polysilazane solution obtained through the same solvent substitution as Comparative Example 1 by using methylnaphthalene was filtered, thereby preparing a composition for forming a silica based layer.

Example 12

A heat treatment was performed through the same process as Comparative Example 1 until polysilazane had a weight average molecular weight of 23,000. Then, a polysilazane solution obtained through the same solvent substitution as Comparative Example 1 by using methylnaphthalene was filtered, thereby preparing a composition for forming a silica based layer.

Method of Measuring Turbidity 20 g of each composition according to Comparative Examples 1 to 4 and Examples 1 to 12 was filled in a 30 ml vial and allowed to stand in a clean room at a temperature of 23±2° C. under a relative humidity of 50±10%, and its turbidity was measured. The turbidity was measured by using 2100N made by HACH Co.

Method of Measuring Gelation Time

The 30 ml vial filled with each composition according to Comparative Examples 1 to 4 and Examples 1 to 12 was allowed to stand in the clean room at a temperature of 23±2° C. under a relative humidity of 50±10%, and its gelation time was measured by tilting the vial at 45° for 5 minutes and then, examining whether the composition flew or not with naked eyes and finding when the composition did not flow after measuring the turbidity of the composition by every hour until 2 days and by every 4 hours from the third day.

The turbidity and the gelation time of each composition according to Comparative Examples 1 to 4 and Examples 1 to 12 were used to calculate its turbidity increasing rate, and the results are provided in Table 1.

*Turbidity increasing rate (NTU/hr)=(turbidity at gelation−initial turbidity)/gelation time

TABLE 1

| | Turbidity increase rate | gelation time (hr) |
|---|---|---|
| Example 1 | 0.005 | 300 |
| Example 2 | 0.028 | 160 |
| Example 3 | 0.013 | 120 |
| Example 4 | 0.073 | 64 |
| Example 5 | 0.015 | 103 |
| Example 6 | 0.084 | 57 |
| Example 7 | 0.027 | 47 |
| Example 8 | 0.125 | 32 |
| Example 9 | 0.013 | 84 |
| Example 10 | 0.073 | 49 |
| Example 11 | 0.023 | 65 |
| Example 12 | 0.12 | 38 |
| Comparative Example 1 | 0.138 | 28 |
| Comparative Example 2 | 0.717 | 10 |
| Comparative Example 3 | 0.23 | 14 |
| Comparative Example 4 | 1.388 | 6 |

Referring to Table 1, each composition for forming a silica based layer according to Examples 1 to 12 showed remarkably excellent gelation time and turbidity increasing rate compared with each composition for forming a silica based layer according to Comparative Examples 1 to 4.

Accordingly, the gelation time varied depending on a solvent used in the compositions for forming a silica based layer, and the compositions for forming a silica based layer according to Examples 1 to 12 using a set or predetermined solvent showed increased gelation time and excellent storage-stability.

Evaluation 2: Layer Characteristics

Method of Measuring the Number of Defects of Insulation Layers 3 cubic centimeters (cc) of each composition of Comparative Examples 1 to 4 and Examples 1 to 12 was taken, coated on a wafer having a diameter of 8 inches at 1500 rpm for 20 seconds and then, heated and dried on a hot plate at a temperature of 150° C. for 3 minutes, thereby forming a layer. The defect level of the layer was measured by using SP1 (Surf Scan SP-1, KLA-Tencor Co.), and the results are provided in Table 2.

TABLE 2

| | At initial stage after SP1 open | At 2 hours after SP1 open |
|---|---|---|
| Example 1 | very good | very good |
| Example 2 | very good | very good |
| Example 3 | very good | very good |
| Example 4 | very good | very good |
| Example 5 | very good | very good |
| Example 6 | very good | good |
| Example 7 | good | good |
| Example 8 | good | good |
| Example 9 | very good | very good |
| Example 10 | good | good |
| Example 11 | very good | very good |
| Example 12 | good | good |
| Comparative Example 1 | very good | inferior |
| Comparative Example 2 | good | inferior |
| Comparative Example 3 | good | Inferior |
| Comparative Example 4 | good | Inferior |

The defect level was evaluated with a reference to Table 3.

TABLE 3

| | The number of defects having a size of 0.2 μm |
|---|---|
| very good | Less than 100 |
| good | 100-300 |
| inferior | Greater than 300 |

Referring to Tables 2 and 3, each composition for forming a silica based layer according to Examples 1 to 12 showed a decreasing defect level as time went compared with each composition for forming a silica based layer according to Comparative Examples 1 to 4.

As used herein, the term "and/or" includes any and all combinations of one or more of the associated listed items. Expressions such as "at least one of" or "at least one selected from" when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 1 12, first paragraph, and 35 U.S.C. § 132(a).

As used herein, the term "substantially," "about," and similar terms are used as terms of approximation and not as terms of degree, and are intended to account for the inherent deviations in measured or calculated values that would be recognized by those of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A composition for forming a silica based layer, comprising a silicon-containing compound comprising polysilazane, polysiloxazane, or a combination thereof and a solvent, and
having a turbidity increasing rate of about 0.005 to about 0.027,
wherein the solvent comprises at least one selected from trimethylbenzene, triethylbenzene, decahydronaphthalene, tetrahydronaphthalene, indene, diethylbenzene, and methylnaphthalene, and
wherein the turbidity increasing rate is defined by Relationship Equation 1, and a gelation time in the Relationship Equation 1 is measured at temperature of about 23° C. ±about 2° C. under a relative humidity of about 50% ±about 10%:

Turbidity increasing rate (NTU/hr) =(Turbidity at gelation−Initial turbidity)/ Gelation time.     Relationship Equation 1

2. The composition of claim 1, wherein the silicon-containing compound comprises polysilazane comprising a moiety represented by Chemical Formula 1:

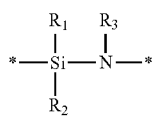

Chemical Formula 1 wherein, in Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and
"*" indicates a linking point.

3. The composition of claim 1, wherein the silicon-containing compound comprises polysiloxazane comprising a moiety represented by Chemical Formula 2 and a silicon-nitrogen (Si—N) bond moiety:

Chemical Formula 2 wherein, in Chemical Formula 2, $R_4$ to $R_7$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and
"*" indicates a linking point.

4. A method for manufacturing a silica based layer, the comprising
coating the composition of claim 1 on a substrate,
drying the substrate coated with the composition to produce a resultant, and
curing the resultant under an inert atmosphere at a temperature of greater than or equal to about 150° C. to manufacture a silica based layer.

5. The method of claim 4, wherein the composition is coated utilizing a spin-on coating method.

6. The method of claim 4, wherein the silicon-containing compound comprises polysilazane comprising a moiety represented by Chemical Formula 1:

Chemical Formula 1 wherein, in Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and
"*" indicates a linking point.

7. The method of claim 4, wherein the silicon-containing compound comprises polysiloxazane comprising a moiety represented by Chemical Formula 2 and a silicon-nitrogen (Si—N) bond moiety:

Chemical Formula 2

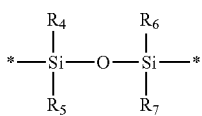

wherein, in Chemical Formula 2, $R_4$ to $R_7$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

8. An electronic device comprising a silica based layer manufactured according to the method of claim 4.

9. The device of claim 8, wherein the silicon-containing compound comprises polysilazane comprising a moiety represented by Chemical Formula 1:

Chemical Formula 1

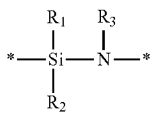

wherein, in Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

10. The device of claim 8, wherein the silicon-containing compound comprises polysiloxazane comprising a moiety represented by Chemical Formula 2 and a silicon-nitrogen (Si—N) bond moiety:

Chemical Formula 2

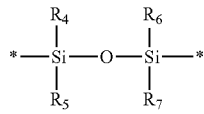

wherein, in Chemical Formula 2, $R_4$ to $R_7$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

11. An electronic device comprising a silica based layer, the silica based layer being a derivative of the composition of claim 1.

12. The composition of claim 1, wherein the silicon-containing compound has a weight average molecular weight of 8,000.

13. The composition of claim 1, wherein the composition has a solid content of 20 wt %.

* * * * *